3,549,710
PREPARATION OF VINYL ARYL ETHERS
John O. Turner, Washington, N.J., and Samuel A. Glickman, Easton, Pa., assignors to GAF Corporation, New York, N.Y., a corporation of Delaware
No Drawing. Filed Dec. 18, 1967, Ser. No. 691,193
       Int. Cl. C07c 43/20
U.S. Cl. 260—612                                  9 Claims

ABSTRACT OF THE DISCLOSURE

A process for the production of aryl vinyl ethers which comprises reacting acetylene with a monohydric phenolic compound, such as phenol, in the presence of an alkali metal hydroxide catalyst wherein the reaction is conducted in the presence of a polyglycol ether solvent such as tetraethylene glycol dimethyl ether. The reaction is carried out at a temperature of about 160° C. to about 200° C. and under a partial pressure of acetylene of about 50 to 200 p.s.i. The use of the polyglycol ether solvent, together with the other conditions of the reaction, results in improved yields and conversions and reduces the amount of catalyst necessary to be employed in the reaction.

BACKGROUND OF THE INVENTION

It is known in the art to prepare aryl vinyl ethers by the reaction of acetylene with a monohydric phenol, such as phenol, but none of the reactions known to the prior art has resulted in a commercially acceptable process which can be adapted to industrial needs with a minimum of difficulty. The primary problem associated with the prior art reactions has been that generally poor yields and conversions to the aryl vinyl ethers have been obtained by reason of the formation of mixtures and recovery difficulties associated therewith. Moreover, it has been found that substantial amounts of resinous products are often formed which negates the attractiveness of the reaction. Furthermore, it has been found that the processes have not been adaptable to conversion to continuous operation which is necessary to provide the desired product at a cost compatible with industrial needs.

In general, the prior art is cognizant that monohydric phenolic compounds may be reacted with acetylene in the presence of an alkali metal hydroxide catalyst under conditions of temperature and pressure to produce the aryl vinyl ethers. In particular, it is known that vinyl phenyl ether may be prepared by heating beta bromoethyl phenyl ether with twice its weight of powdered potassium hydroxide employing temperatures as high as 290° C. This reaction was not found satisfactory however, in view of yields less than 50% of the theoretical and the necessary high temperatures.

Vinyl phenyl ether, the vinyl tolyl ethers, and vinyl 1-naphthyl ether have been prepared by a vinylation process based on the reaction of acetylene with phenol, the cresols, and 1-naphthol, respectively. These preparations are described by M. F. Shostakovskiii et al., reported in J. Applied Chem. (U.S.S.R.), 15, pp. 260–266 (1942). These authors employed potassium hydroxide as a catalyst in an amount corresponding to 5 to 20% of the weight of phenol or cresol. However, the authors reported that resinification occurred during the vinylation reaction unless water was added thereto. The authors therefore recommended that water be added in the amount of 10 to 15% of the weight of the phenol or cresol starting material. However, while the use of the water may have overcome the problems with resinification, use of the water makes product recovery extremely difficult and thus the process described is not a commercially acceptable procedure for the preparation of aryl vinyl ethers.

In U.S. Pat. No. 1,959,927 to Reppe et al., issued May 22, 1934, there is described a process for the vinylation of phenolic compounds wherein sodium phenolate and potassium hydroxide are employed as catalysts and methanol is employed as a solvent in the reaction. The process is carried out employing a 2 to 1 mixture of acetylene and nitrogen for 20 to 24 hours at 180° C. and pressures of 40 to 50 atmospheres. This extreme pressure, however, was found to render the process hazardous and dangerous because of the acetylene reactant and further requires a considerable period of time for the vinylation reaction to go to completion. Furthermore, the methanol solvent employed must be recovered and the final product was found to contain a small amount of phenol as an impurity which was required to be removed by treatment with caustic soda. Moreover Reppes' process is limited to phenolic compounds free of exchangeable halogen groups which might react with the alkali in an undesirable manner.

In still another prior art process, as described in Wilkinson U.S. Pat. No. 2,695,920, the vinylation of phenolic compounds is carried out by reaction with an acetylene-propane mixture in the absence of a solvent and in the presence of a large alkali metal catalyst concentration in the amount of about 25 to 30 weight percent based on the phenolic starting material. The use of the large amounts of catalysts by Wilkinson et al. apparently served to eliminate the requirement for the presence of water, but the large amounts of catalysts necessary to carry out the process prevented its commercial acceptance because of the prohibitive cost of the alkali metal hydroxide catalysts. The catalyst is not re-usable in the process of Wilkinson et al. because of the absence of solvent. Moreover the use of the large amount of catalyst gives rise to the production of potassium or alkali metal phenoxide which precipitates from the vessel walls and therefore reduces the yield obtained in the reaction. Furthermore, the process described by Wilkinson et al. is not adaptable to continuous operation.

It is therefore obvious that a distinct need remains in the art for a commercially acceptable and non-hazardous process for the production of aryl vinyl ethers by the direct reaction of acetylene with a monohydric phenolic compound.

SUMMARY OF THE INVENTION

It is accordingly one object of the present invention to provide an improved process for the production of aryl vinyl ethers wherein improved conversions are obtained and which otherwise mitigates the disadvantages of prior art processes in this area.

It is a further object of this invention to provide an improved process for the production of aryl vinyl ethers by the reaction of acetylene with a monohydric phenolic compound wherein a solvent is employed which serves to improve the conversions obtained and reduces the amount of catalyst necessary to drive the reaction to completion.

A still further object of the invention is to provide a process for the reaction of acetylene with a monohydric phenolic compound wherein the reaction is carried out in the presence of a relatively small amount of alkali metal catalyst and in the presence of a polyglycol ether solvent which serves to mitigate the problems encountered by prior art reactions and further provides a process which obviates prior art recovery problems and is easily adaptable to continuous operation.

Other objects and advantages of the present invention will become apparent as the description thereof proceeds.

In satisfaction of the foregoing objects and advantages, there is provided by the present invention a process for the production of aryl vinyl ethers which comprises reacting a monohydric phenolic compound with acetylene which comprises carrying out the reaction in the presence of an alkali metal hydroxide catalyst and employing a polyglycol ether solvent at a reaction temperature of about 160° C. to about 200° C. and an acetylene partial pressure of about 50 to 200 p.s.i.

DESCRIPTION OF THE PREFERRED EMBODIMENTS

As pointed out, the process of this invention comprises the reaction of a monohydric phenolic compound with acetylene in the presence of an alkali metal hydroxide and a polyglycol ether solvent.

The vinyl aryl ethers which may be prepared in accordance with the improved process may be characterized by the following general formula:

$$CH_2=CH-O-R$$

wherein R represents the residue of a substituted or unsubstituted monohydric aromatic phenol of the benzene, naphthalene, anthracene, phenanthrene, naphthacene, chrysene, pyrene, triphenylene series, and the like.

The monohydric phenolic compounds employed as starting materials in the process of this invention are well known in the art and may be substituted or unsubstituted phenols. The only limitation to be placed on the substituted phenols employed is that they be stable under the reaction conditions of the process and further, any substituent group attached to the ring must not be capable of being attacked by the strong base used as a catalyst in the reaction. Groups of this latter type include aldehydes, esters, and the like. Of the several monohydric phenols considered operable in the present process, there may be mentioned phenol, o-cresol, p-cresol, m-cresol, p-isopropylphenol, 4-alkylphenols, 4-bromophenol, 4-chlorophenol, 4-methoxyphenol, 2-bromophenol, 2-chlorophenol, 2-methoxyphenol, the isomeric dimethylphenols, isomeric diethylphenols, isomeric di-n-propylphenols, dichlorophenol, 2,4-dichlorophenol, 2-chloro-4-methylphenol, t-butylphenol, hexylphenols, nonylphenols, octylphenols, dibutylphenol, dinonylphenol, m-trifluoromethylphenol, p-fluorophenol, alpha-naphthol, beta-naphthol, thymol and the like. Other phenolic compounds considered operable in the present process are disclosed in above-mentioned U.S. Pat. No. 2,695,920, the disclosure of which is incorporated herein by reference.

The phenyl vinyl ethers of greatest immediate interest are those derived from phenol and alkyl substituted phenols, particularly those alkyl substituted phenols having one or two alkyl substituents of from 1 to 10 carbon atoms. Therefore, unsubstituted phenol or such alkyl phenols are preferably employed in practicing the present invention.

The acetylene employed to react directly with the monohydric phenolic compound is employed in gaseous form and is preferably mixed or diluted with an inert gas such as nitrogen for reasons of safety. Other inert gases such as propane and the like may be employed to dilute the acetylene for use in the process of the present invention. In using the gaseous mixture in the reaction, the inert gas is preferably initially introduced into the reaction to obtain an inert atmosphere and the acetylene is then introduced. The pressure of acetylene to be maintained during the reaction should be in the range of about 50 to about 200 p.s.i. with a preferred range of about 100 to about 130 p.s.i. for optimum conditions.

The catalyst employed in the reaction is an alkali metal hydroxide and it has been found that potassium hydroxide and sodium hydroxide are equally advantageous in carrying out the reaction of this invention. The alkali metal catalyst is employed in solid from and the commercially available materials may be employed in the reaction. The alkali metal hydroxide catalyst is employed in an amount of about 2% to about 10% based on the weight of the monohydric phenolic starting material.

An important feature of the present invention resides in the solvent employed as the reaction medium for carrying out the process of this invention. It has been found according to the present invention that improved results are obtained if the process is carried out in the presence of a polyglycol ether solvent as the use of this solvent overcomes or otherwise mitigates the disadvantages of similar prior art processes. The polyglycol ether solvents employed in the reaction may be represented by the following structural formula:

$$R_1O\left(CHRCHR-O\right)_n R_2$$

wherein R is selected from the group consisting of hydrogen and methyl, $R_1$ is alkyl of 1 to 3 carbon atoms, and $R_2$ is selected from the group consisting of vinyl and alkyl of 1 to 3 carbon atoms and $n$ is an integer of 1 to 5.

As examples of polyglycol ethers useful as solvents in the process of the present invention falling within the above formula, there may be mentioned the following:

(a) Dimethylether of di-, tri-, tetra- and pentaethylene glycol;
(b) diethyl ether of di-, tri-, tetra- and pentaethylene glycol;
(c) Vinyl ethers of the monomethyl ethers of di-, tri-, tetra- and pentaethylene glycol; and
(d) Vinyl ethers of the monoethyl ethers of di-, tri-, tetra- and pentaethylene glycol.

It is to be appreciated that equivalent polyglycol ethers may be employed in the reaction as desired. Thus it is clear from the above formula that the solvents employed in the present reaction are inclusive of ethers of polyethylene oxide, polypropylene oxide and polybutylene oxide. Moreover, it is to be understood that mixed ethers of the polyethylene, polypropylene, and polybutylene oxides may be employed as desired as such mixtures have been found to be equally operative.

The only limitation to be placed on the polyglycol ether solvents employed in the present reaction is that the ether solvent should differ considerably in boiling point from the aryl vinyl ether being prepared by the reaction in view of the fact that a preferred manner of recovering the aryl vinyl ether is by distillation. Moreover, the phenolic starting material should be reasonably soluble in the ether solvent for optimum results.

Of the several polyglycol ethers described hereinabove, it is preferred to employ the polyethylene glycol ethers with a more preferred and specific solvent being tetraethylene glycol di-methyl ether.

The polyglycol ether solvent may be employed in the reaction in varying amounts. Thus the amount of solvent employed may range from up to two, three and four times the weight of the phenolic starting material. However, the amount of solvent employed should not be so high as to constitute an unnecessary load on the system. The reaction can be run with noticeable improvement, employing as little polyglycol ether as 20% by weight of the phenol. Quite satisfactory results have been obtained employing an amount of polyglycol ether solvent corresponding to about 20% to about 100% of the weight of the phenolic starting material and amounts within this range would ordinarily be preferred.

The reaction is carried out at a temperature in the range of about 150° C. to about 200° C. as it has been found that this temperature range is conducive to good recovery of the final product. In this connection it is to be noted that a preferred temperature on the order of about 180° C. to about 190° C. appears to represent the optimum temperature range for carrying out the process of this invention.

The reaction is also carried out under conditions of pressure and preferably under a partial pressure of acetylene in the general range of 50 to 200 p.s.i. with the preferred range of pressure of acetylene of about 100 to 130 p.s.i. which, converted to atmospheres, represent a partial acetylene pressure of about 6 atmospheres.

In a preferred manner of carrying out of the process of this invention, the phenolic reactant, catalyst and the glycol ether solvent are charged to a stainless steel autoclave equipped with means for agitation and the autoclave thereafter is purged with nitrogen and heated to approximately 180 to 200° C. Thereafter nitrogen gas is passed into the reactor in order to obtain a nitrogen pressure of approximately 70 p.s.i.g. and also to provide an inert atmosphere within the reactor. Thereafter, the acetylene is passed into the reactor to achieve a total pressure of approximately 200 p.s.i.g. while maintaining the temperature in the desired range and the reaction is allowed to proceed over the time interval required to complete the reaction. During the reaction period acetylene is continually added to the reaction mixture to maintain the desired pressure conditions until the required amount of acetylene is taken up. After completion of the reaction the reactor is cooled and the product removed from the autoclave and distilled under reduced pressure and the product assayed by use of gas chromatography.

It has been found that conversions on the order of 79 to 85% of the phenol to vinyl aryl ethers may be obtained using the process of this invention. It has also been found that yields of 75 to 85% are obtained by the process of this invention as opposed to yields of only 55% to 60% obtained by the best prior art processes. It is therefore to be appreciated that the process of the present invention results in substantial improvements in the processes of producing vinyl aryl ethers by the direct reaction of a monohydric phenol with acetylene.

One of the primary advantages of the process of the present invention is that it is easily adaptable to one of continuous operation. Thus, when the reaction is complete, the product is subjected to distillation, the catalyst-solvent mixture remaining in the distillation vessel may be recirculated to a continuous reactor without additional steps of separation and the product is thus easily removed from the catalyst and solvent by use of the distillation technique. The general requirements for converting the process to continuous operation and the apparatus necessary therefor are of course conventional in the art and need not be described in detail here.

The following examples illustrate preferred embodiments of the process of this invention. However, the examples are not to be construed as limiting the process set forth therein.

EXAMPLE 1

The apparatus employed in this example was a one liter stainless steel autoclave equipped with a stirrer and means for the introduction of nitrogen and acetylene gases therein.

To the autoclave was charged 188 grams (2.0 mols) of phenol, 22 grams of potassium hydroxide (85% assay) and 200 grams tetraethylene glycol di-methyl ether. The autoclave was then purged with nitrogen and heated to 190° C. Thereafter, additional nitrogen was introduced to achieve a nitrogen pressure of 70 p.s.i.g. Then acetylene gas was introduced into the reactor to reach a total pressure of 200 p.s.i.g. Thereafter the autoclave was stirred and the temperature maintained at 190° C. over a 12-hour interval while adding acetylene to maintain the total pressure at about 200 p.s.i.g. During this reaction period an uptake of 52.0 grams (2.0 mols) of acetylene was noted.

After completion of the reaction, the mixture was cooled and the reaction product poured from the autoclave into a distillation flask and distilled at reduced pressure (17 mm.) to yield 189.5 grams of phenyl vinyl ether; boiling point 55° C./17 mm., $n_D^{25}$ 1.5205, representing a yield of 79% of theory based on the phenol starting material. The gas chromatographic assay of the product was 99.9% phenyl vinyl ether.

During the distillation the pot temperature climbed gradually from 62° to 140° C. at 17 mm. The distillation was stopped at this point and the catalyst-solvent residue was poured back into the autoclave to be reused in a second vinylation process as described below.

The foregoing experiment was repeated using identical conditions, except that 19.5 g. of NaOH were employed in place of the KOH. The yield of phenyl vinyl ether in this case corresponded to 73% of theory.

The experiment was again repeated using KOH under identical conditions, except that 70 g. of tetraethyleneglycol dimethyl ether (instead of 200 g. thereof) were employed as a solvent. The yield of phenyl vinyl ether in this case corresponded to 72% of theory.

EXAMPLE 2

Employing the identical equipment, techniques and conditions described in Example 1, 182 grams (1.93 mols) of phenol and 6.7 grams of potassium hydroxide (85% assay) were added to the catalyst-solvent residue from Example 1 and submitted to the vinylation reaction which was carried out at 190° C. over a reaction interval of 12 hours while maintaining the pressure at 200 p.s.i.g.

In this example, the conversion of the phenol to the vinyl phenyl ether was 82% of theory. The catalyst-solvent residue from this example was recovered and returned to the autoclave for further use as described in Example 3.

EXAMPLE 3

Using the same equipment, techniques and conditions described in Example 1, 188 grams (2.0 mols) of phenol was added to the catalyst-solvent residue from Example 2 and submitted to the vinylation reaction.

The reaction time was 14 hours and the conversion of phenol to vinyl phenyl ether was 85% of theory.

EXAMPLE 4

Using the same equipment, techniques and conditions described in Example 1, 248 grams (2.0 mols) of p-methoxyphenol, 14.7 grams of 85% assay potassium hydroxide (5 weight percent) and 225 grams of tetraethyleneglycol dimethyl ether were submitted to the vinylation reaction in the autoclave. The reaction time was 12–14 hours at approximately 190° C. with a total pressure of 200 p.s.i.g.

After completion of the reaction, the reaction product was poured into a distilling flask and distilled to yield p-methoxyphenyl vinyl ether having a boiling point of 68–69° C. at 1.7 mm. $n_D^{25}$ 1.5279. The VPC assay without additional purification was 99.9%, and the conversion of the p-methoxyphenol to the vinyl p-methoxyphenyl ether was 82% of theory.

EXAMPLE 5

Employing the same equipment, techniques, and conditions described in Example 1, 300 grams (2.0 mols) of p-tertiary-butylphenol, 35 g. of 85% assay potassium hydroxide (10 weight percent), and 250 grams of tetraethyleneglycol dimethyl ether were submitted to the vinylation reaction. The temperature was maintained at 190° C. with a pressure of 200 p.s.i.g. over a reaction period of 11 hours.

The reaction product was then distilled directly through an 18 inch Vigreux column to yield p-tertiary-butylphenyl vinyl ether having a boiling point of 85° C. at 2.9 mm., $n_D^{25}$ 1.5080. The conversion of p-tertiary-butylphenol to the ether derivative was 80% of theory and the VPC assay was 98% without additional purification.

From the above examples, it can be seen that the present invention provides a commercially acceptable process which is adaptable to continuous operation for the direct reaction of a monohydric phenol with acetylene to produce aryl vinyl ethers in good yields and conversions.

Moreover, it will be seen that the process of this invention overcomes or otherwise mitigates the problems incurred by the prior art in reactions of this type.

It will be understood that this invention is susceptible to further obvious modification and therefore all such obvious modifications are considered to fall within the scope of the present invention and the invention is to be limited only by the scope of the appended claims.

What is claimed is:

1. In a process for the production of aryl vinyl ethers by the reaction of a monohydric phenolic compound selected from the group consisting of phenol, para-methoxy phenol, and phenol containing one or two alkyl substituents each of which contains one to about ten carbon atoms, is reacted with acetylene in the presence of an alkali metal hydroxide catalyst at a temperature of about 160° to 200° C. under a partial pressure of acetylene of about 50 to about 200 p.s.i., the improvement which comprises conducting the reaction in the presence of a polyglycol ether solvent of the following structural formula:

$$R_1O(CHRCHR—O—)_nR_2$$

wherein R is selected from the group consisting of hydrogen and methyl, $R_1$ is alkyl of 1 to 3 carbon atoms, $R_2$ is selected from the group consisting of vinyl and alkyl of 1 to 3 carbon atoms and $n$ is an integer of 1 to 5.

2. A process according to claim 1 wherein the alkali metal hydroxide catalyst is selected from the group consisting of sodium hydroxide and potassium hydroxide.

3. A process according to claim 2 wherein the catalyst is employed in the amount of about 2 to 10 percent by weight.

4. A process according to claim 3 wherein the reaction is carried out at a temperature of about 180 to 190° C.

5. A process according to claim 4, wherein the reaction is carried out under an acetylene partial pressure of about 100 to 130 p.s.i.

6. A process according to claim 5 wherein the reaction is carried out under an atmosphere of an inert gas.

7. A process according to claim 6 wherein the monohydric phenolic compound is phenol, the catalyst is potassium hydroxide, the solvent is tetraethyleneglycol and the inert gas is nitrogen.

8. A process according to claim 6 wherein the phenol is p-methoxy phenol.

9. A process according to claim 6 wherein the phenol is p-tertiarybutylphenol.

References Cited

UNITED STATES PATENTS

| 1,959,927 | 5/1934 | Reppe | 260—612(D)X |
| 2,615,050 | 10/1952 | Insinger | 260—612(D) |
| 2,695,920 | 11/1954 | Wilkinson et al. | 260—612(D) |
| 2,969,395 | 1/1961 | Nedwick et al. | 260—614 X |

BERNARD HELFIN, Primary Examiner

U.S. Cl. X.R.

260—613